(No Model.)
S. T. LEGGETT.
NUT LOCK.
No. 332,093. Patented Dec. 8, 1885.
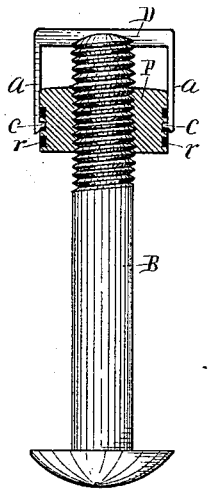
Fig. 1.
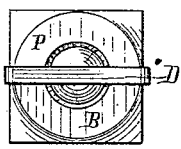
Fig. 4.
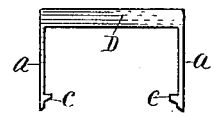
Fig. 5.
Fig. 2.
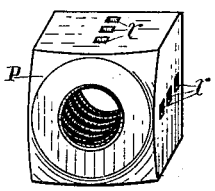
Fig. 3.
Witnesses.
John C. Perkins
D. P. Montgomery
Inventor.
Stephen T. Leggett
By Lucius C. West
Atty.

UNITED STATES PATENT OFFICE.

STEPHEN T. LEGGETT, OF BIG RAPIDS, MICHIGAN.

NUT-LOCK.

SPECIFICATION forming part of Letters Patent No. 332,093, dated December 8, 1885.

Application filed September 7, 1885. Serial No. 176,306. (No model.)

*To all whom it may concern:*

Be it known that I, STEPHEN T. LEGGETT, a citizen of the United States, residing at Big Rapids, county of Mecosta, State of Michigan, have invented a new and useful Nut-Lock, of which the following is a specification.

This invention has for its object the construction of an improved nut-lock, substantially as hereinafter described and claimed.

In the drawings forming a part of this specification, Figure 1 is an elevation with the nut in vertical section; Fig. 2, an elevation with the lock-bow detached, looking from a point at the right of Fig. 1; Fig. 3, the nut in enlarged perspective; Fig. 4, top view, and Fig. 5 an elevation, of the lock-bow.

Referring to the letters marked on the drawings, B represents a threaded bolt of the ordinary style, except the transverse slot $v$ in the end, Fig. 2. P is a nut having the ordinary threaded hole, $f$, screwing onto the threaded end of the bolt B. An elastic lock-bow, made of spring metal, having elastic side bars $a\,a$, which are provided at the terminal ends with lugs $c\,c$, adapted to detachably and adjustably engage with the series of notches $r$ in the sides of the nut P. The design is to make the threaded end of the bolt B of such a length that the lugs $c\,c$ will engage a notch, $r$, of the nut when the nut is screwed down sufficiently tight. By having a series of notches less accuracy in said length of the threaded end is required, and the nut may be tightened, if needed, by entering the lugs $c$ in a notch nearer the device being bound by the nut.

In the operation the nut is screwed down tight, and then the lock-bow is inserted in the slot $v$, and pressed down therein, and, as the side bars, $a\,a$, are elastic, they will spring, allowing the lugs to engage with the proper notches in the sides of the nut to hold the lock-bow on the nut and the upper bar of the lock-bow D in the slot $v$. Thus the nut is locked from turning. When desiring to turn the nut on farther or off, the elastic sides are sprung out, releasing the lugs $c$ from the notches $r$, when the lock-bow can be readily detached.

Such a lock is effectual, easily operated, and simple in construction, and is suitable for locking all kinds of bolts and nuts, including those used in railway fish-plates and the nuts of vehicle-axles.

Having thus described my invention, what I claim as new, and desire to secure by Letters Patent, is—

The combination of a bolt provided with the transverse slot in the end, a nut having series of gains in each side, and the lock-bow adapted to enter the bolt-slot and to engage the series of gains in the nut, substantially as set forth.

In testimony of the foregoing I have hereunto subscribed my name in presence of two witnesses.

STEPHEN T. LEGGETT.

Witnesses:
GEO. D. B. HALL,
E. VROLGUIDEWIG.